US009957950B2

(12) United States Patent
Canedo Pardo et al.

(10) Patent No.: US 9,957,950 B2
(45) Date of Patent: May 1, 2018

(54) BLADE PITCHING

(71) Applicant: ALSTOM RENEWABLE TECHNOLOGIES, Grenoble (FR)

(72) Inventors: Santiago Canedo Pardo, Barcelona (ES); Javier Garcia Cervilla, Barcelona (ES)

(73) Assignee: GE Renewable Technologies Wind B.V., Breda (NL)

( * ) Notice: Subject to any disclaimer, the term of this patent is extended or adjusted under 35 U.S.C. 154(b) by 312 days.

(21) Appl. No.: 14/750,959

(22) Filed: Jun. 25, 2015

(65) Prior Publication Data
US 2016/0010625 A1    Jan. 14, 2016

(30) Foreign Application Priority Data

Jul. 10, 2014  (EP) ..................................... 14382267

(51) Int. Cl.
*F03D 7/02* (2006.01)
*F03D 15/00* (2016.01)
*F03D 1/06* (2006.01)

(52) U.S. Cl.
CPC ......... *F03D 7/0224* (2013.01); *F03D 1/0658* (2013.01); *F03D 1/0675* (2013.01); *F03D 15/00* (2016.05); F05B 2260/40311 (2013.01); F05B 2260/74 (2013.01); F05B 2260/79 (2013.01);
(Continued)

(58) Field of Classification Search
CPC ...... F03D 7/0224; F03D 15/00; F03D 1/0658; F03D 1/0675
See application file for complete search history.

(56) References Cited

U.S. PATENT DOCUMENTS 7,828,682 B2 * 11/2010 Smook .................... F03D 15/00
                                                              475/331
8,075,442 B2 * 12/2011 Ciszak .................... F03D 15/00
                                                              475/331
(Continued)

FOREIGN PATENT DOCUMENTS

DE        39 04 141        3/1990
DE   20 2010 009462        9/2010
(Continued)

OTHER PUBLICATIONS

European Search Report for EP 14382267, dated Nov. 24, 2014, 6 pgs.

*Primary Examiner* — Igor Kershteyn
*Assistant Examiner* — Eric Zamora Alvarez
(74) *Attorney, Agent, or Firm* — Dority & Manning, P.A.

(57) ABSTRACT

A blade pitch system for a wind turbine comprising a motor coupled to a central reduction gearing, wherein a rotatable output of the central reduction gearing is fixed to a mobile link that in use is joined to the blade and allows rotation of the blade around its longitudinal axis and a static part of the central reduction gearing or the motor is fixed to a static link that in use is joined to a wind turbine hub, wherein the system further comprises one or more flexible couplings to couple the central reduction gearing or the motor and the static or the mobile link such that torque about a blade longitudinal axis is transmitted between the blade and the reduction gearing while substantially limiting the transmission of other loads.

12 Claims, 1 Drawing Sheet

(52) U.S. Cl.
CPC ....... *F05B 2260/964* (2013.01); *Y02E 10/721* (2013.01); *Y02E 10/723* (2013.01)

(56) References Cited

U.S. PATENT DOCUMENTS

| | | | |
|---|---|---|---|
| 2009/0016885 A1* | 1/2009 | Bech | F03D 7/00 416/155 |
| 2010/0276932 A1 | 11/2010 | Numajiri | |
| 2010/0296927 A1* | 11/2010 | Siniscalchi | F03D 1/0658 416/46 |
| 2013/0136604 A1* | 5/2013 | Lin | F03D 1/0658 416/204 R |
| 2013/0202232 A1* | 8/2013 | Mueller | F03D 7/0224 384/129 |

FOREIGN PATENT DOCUMENTS

| | | |
|---|---|---|
| EP | 1 878 917 | 1/2008 |
| EP | 2 253 840 | 11/2010 |
| ES | 1074081 | 3/2011 |

\* cited by examiner

BLADE PITCHING

This application claims the benefit of European Patent Application 14382267.4 filed on Jul. 10, 2014, the entire contents of which are hereby incorporated by reference.

The present disclosure relates to blade pitch systems and to wind turbine rotors and wind turbines comprising such systems.

BACKGROUND

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The gearbox (if present), the generator and other systems are usually mounted in a nacelle on top of a wind turbine tower.

The loads on the rotor may be controlled by pitching the blades, i.e. by rotating each blade around its longitudinal axis (from root to tip) which causes the wind to engage a larger or smaller surface of the blade. Lift and drag can thus be changed to influence the aerodynamic torque on the rotor. This way, even though the wind speed may increase, the torque transmitted by the rotor to the generator can remain substantially the same.

For the purposes of pitching the blades, each blade may be mounted on the hub employing a pitch system. In many known turbines, such a pitch system may comprise a pitch bearing arranged between the hub and the blade and a pitch drive which may include an hydraulic or electric motor. The motor, through the use of a reduction gearing (sometimes referred to as a "reductor", or as a "reduction gear") drives an actuating gear.

In these implementations, planetary gearboxes are often used. Planetary gearboxes are generally able to deliver high reduction ratios in small packages, and also to transmit several times more torque than similarly sized, conventional gear units. Furthermore, they are compact and lightweight, and require little installation space.

The actuating gear (pinion) may generally be arranged to mesh with an annular gear provided on the wind turbine blade to set the blade into rotation and change its pitch angle. It is also possible however, to provide the annular gear on the hub, whereas the motor and actuator may be mounted on the blade.

It is also known to provide pitch configurations with a central gearbox.

In these central pitch configurations, one flange is normally connected between the hub and the gearbox and another flange or disc is connected between an output of the gearbox and the blade. Documents EP2253840 and ES1074081 describe such systems.

Several disadvantages related to more classical electromechanical pitch systems related e.g. to fretting corrosion resulting in premature wear of certain annular gear teeth repeatedly touching each other i.e. those teeth contacting each other in the pitch position at or below nominal wind speed can be avoided with a central pitch configuration. However, the constantly varying torque around the blade's longitudinal axis and bending loads on the blades may cause misalignments, vibrations and bending loads in the planetary gearbox internal mechanisms such as bearings and gears. The lifetime of such components (or the system as a whole) may thus be shortened.

It is an object of the present disclosure to provide blade pitch systems that at least partially reduces one or more of the aforementioned drawbacks.

SUMMARY

In a first aspect a blade pitch system for a wind turbine is provided. The blade pitch system comprises a motor coupled to a central reduction gearing. A rotatable output of the central reduction gearing is fixed to a mobile link that in use is joined to a blade and allows rotation of the blade around its longitudinal axis and a static part of the central reduction gearing or the motor is fixed to a static link that in use is joined to a wind turbine hub. The pitch system further comprises one or more flexible couplings to couple the central reduction gearing or the motor to the static or the mobile link such that torque about a blade longitudinal axis is transmitted between the blade and the reduction gearing while substantially limiting the transmission of other loads.

Throughout the present disclosure the term static link is to be understood as a link connecting two elements and which is adapted not to move with respect to the hub. The term mobile link is to be understood as a link connecting two elements which is adapted to move, i.e. rotate with respect to the hub.

According to this aspect, the flexible coupling(s) arranged between the central reduction gearing or the motor and any of the static or mobile links is adapted to mitigate loads other than torque such that the pitch system transmits the torque about the blade's longitudinal axis while the transmission of other loads e.g. bending moments, axial and transversal loads and misalignments derived from these loads is substantially reduced. It should be understood that the couplings cannot fully avoid the transmission of such other loads.

By providing one or more flexible couplings, the stiffness of the coupling between the central reduction gearing or the motor and the mobile or the static link with respect to loads other than torque may be reduced. The torque between the central reduction gearing and the blade may still be effectively transmitted, but the transmission of loads other than torque is substantially reduced. The flexible coupling also absorbs torque vibrations derived from the rotation of the blade thus defining a substantially pure torque working condition for the central reduction gearing. This means that the central reduction gearing receives less loads and that its lifetime can be extended.

Throughout the present disclosure a flexible coupling arranged between the central reduction gearing or the motor and the static or the mobile links may also cover a flexible coupling provided between the static or the mobile links and e.g. an intermediate support or piece provided close to the central reduction gearing or the motor. In these cases, the intermediate piece may be made integral with the central reduction gearing or the motor or it may be a separate piece and "close to" may be understood as distanced from the central reduction gearing or motor e.g. not more than one third or one fourth of the distance (radius) from the center to the blade or hub.

Furthermore, since the flexible coupling is provided close to the reduction gearing (or the motor), the displacements to be absorbed are also reduced, at least compared to e.g. displacements derived from e.g. a flexible coupling arranged close to e.g. the blade or the hub.

In some examples, the flexible coupling may be provided between the rotatable output of the central reduction gearing and the mobile link. In these cases, the mobile link transmits torque to the blade and at the same time provides stiffness to the blade.

In some examples, the flexible coupling may be provided between the static part of the central reduction gearing or the motor and the static link. This coupling enhances the transmission of only torque as the static link in use will be joined to a hub which is a substantially rigid element.

In some examples, the mobile and/or static link may comprise an annular disc. In some of these cases, the pitch system may further comprise a lubrication system and one or more components of the lubrication system may be arranged on any of these annular discs, i.e. the annular disc of the static link and/or the annular disc of the mobile link. This way, the components of the lubrication system can be arranged inside a substantially closed area as the blade root or the hub. There is thus no need for an additional cover or any other protection means.

According to a further aspect, a wind turbine rotor comprising a hub and one or more blades is provided. The blades comprise a blade pitch system substantially as hereinbefore described.

According to a still further aspect a wind turbine comprising a wind turbine rotor substantially as hereinbefore described is provided.

BRIEF DESCRIPTION OF THE DRAWINGS

Non-limiting examples of the present disclosure will be described in the following with reference to the appended drawing, in which.

DETAILED DESCRIPTION OF EXAMPLES

Figure 1:
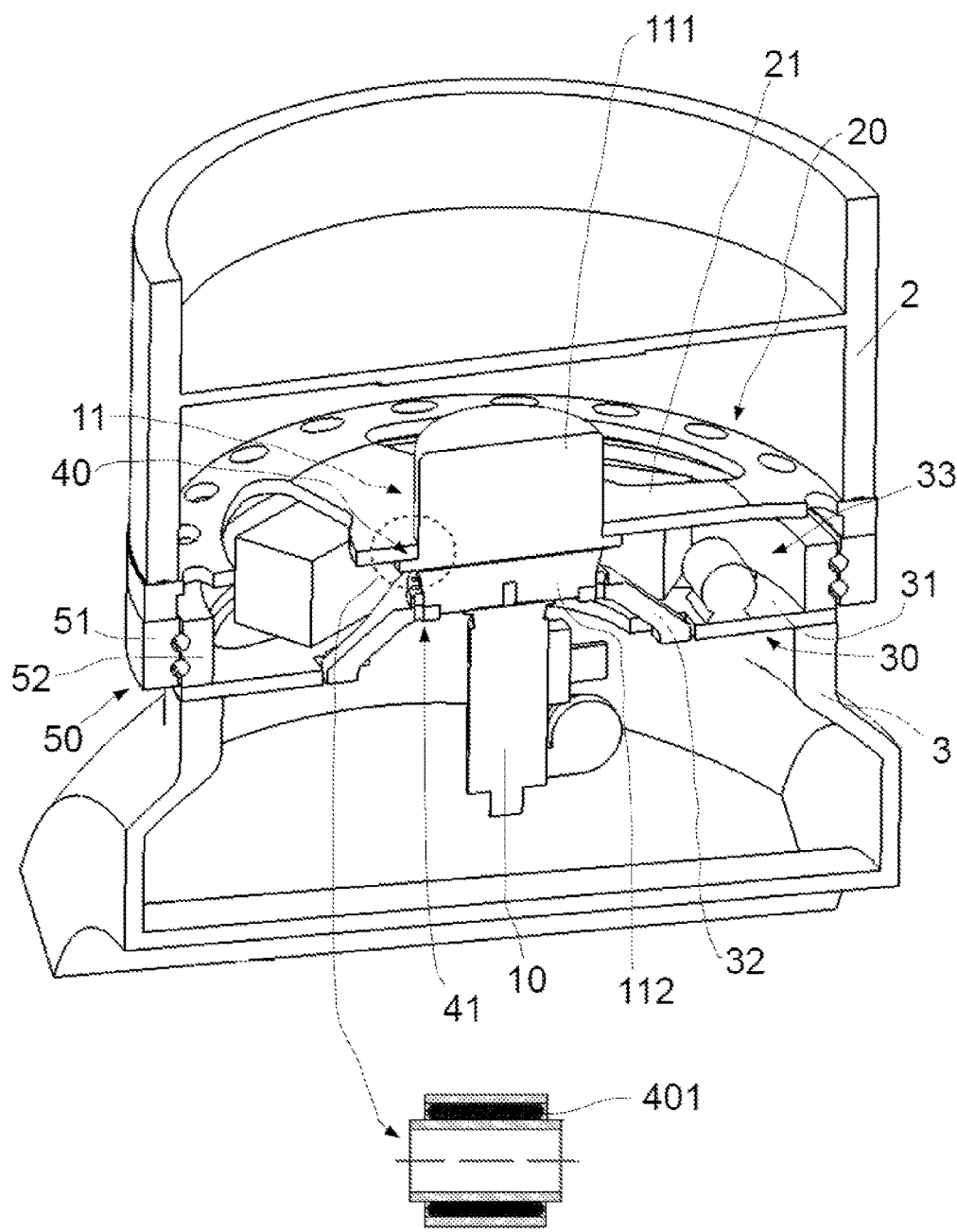
FIG. 1 shows a cross-sectional view of a blade pitch system according to an example.

FIG. 1 shows a cross-sectional view of a blade pitch system according to an example mounted in a wind turbine rotor comprising a hub (only partly visible) and a plurality of blades (only part of one is visible). A bearing 50 may be provided between the hub 3 and the blade 2. The bearing 50 may comprise an inner bearing ring 52 that may be fixed to the hub and an outer bearing ring 51 that may be fixed to a blade. The bearing may furthermore comprise one or more rows of rolling elements between these two bearing rings, which may allow both bearing rings 51, 52 to rotate relative to each other.

In alternative examples, the blade could be attached to the inner bearing ring and the hub would be attached to the outer bearing ring. A blade pitch system may comprise a motor 10 that may be coupled to a central reduction gearing 11. The central reduction gearing 11 may comprise a planetary gear train arranged inside a casing and defining a rotatable output 111 that may be fixed to a mobile link 20. In the example of FIG. 1, the mobile link 20 may be joined to the outer bearing ring 51 and to a wind turbine blade 2. In alternative examples, the mobile link may be joined to an inner side of the blade, in further examples the mobile link may be fixed to an inner surface of a bearing ring. This way, the rotatable output 111 of the reduction gearing 11 allows for rotation of the blade 2 around its longitudinal axis.

A flexible coupling 40 may be provided directly between the mobile link 20 and the rotatable output 111 of the central reduction gearing 11. The flexible coupling 40 may comprise a flexible bushing 401 (see enlarged detail of FIG. 1) provided in each bolted connection (not shown). The bushings 401 may absorb axial and radial movements and misalignments derived from them. An aspect of the bushings is that they can be easily retrofit in existing pitch systems having a simple bolted connection between the rotatable output of the central reduction gearing and a link connecting it to a bearing ring.

In alternative examples, the flexible coupling may be provided between the mobile link and an intermediate piece connected to or integrally formed with the central reduction gearing. In these cases, the intermediate piece may span one third (or less) of a radius from the center of e.g. the central reduction gearing to the blade.

The central reduction gearing may further comprise a static part 112. The static part 112 may be fixed to a static link 30 that may be joined to an inner bearing ring 52 connected to the hub 3. A flexible coupling 41 may be provided between the static link 30 and the reduction gearing static part 112. In alternative embodiments the further flexible coupling may be provided between the static link and the motor 10 (motor casing). The flexible coupling 41 may be made equal to or substantially similar to flexible coupling 40 in that axial and radial movements and misalignments derived from them may be absorbed. As explained above, in alternative examples, the flexible coupling may be provided between the static link and an intermediate piece connected to or integrally formed with the reduction gearing static part or the motor. In these cases, the intermediate piece may span one third (or less) of a radius from the center of the reduction gearing or the motor to the hub.

All flexible couplings are substantially similar in the sense that substantially only torque is transmitted between the blade and the reduction gearing while substantially limiting the transmission of other loads. This means that loads, other than torque may be mitigated by the flexible couplings.

Although some examples of flexible couplings have been described, it should be understood that other possibilities may also be foreseen. In that sense "flexible couplings" are to be understood as couplings that yield ("give in") relatively easily under loads. They may be made from any suitable material, e.g. elastic, visco-elastic or elastomer materials, or combinations of metals with these materials or yet other suitable materials. The flexible couplings may obtain their flexible properties due to their shape, material, positioning, mounting or combinations of these. An aspect of couplings consisting of flexible material elements is that they may be easy to manufacture and install and may not require a lot of maintenance.

In the example of FIG. 1, the mobile link 20 may comprise two or more spokes 21 (in the figure only two are visible) symmetrically and radially arranged between the rotatable output 111 and the outer bearing ring 51 and the blade 2. In this example, the static link 30 may comprise an annular disc 31 connected to the inner bearing ring 52 and the hub 3 and an extension 32 (in this view, an upward extension if seen from the annular disc to the reduction gearing) may connect the annular disc with the static part 112 of the reduction gearing. In this example flexible bushings substantially as hereinbefore described may further be provided between the extension 32 and the annular disc 31. In this case, a void space 33 may be available between the mobile link 20 and the annular disc 31. In the space 33 one or more components of e.g. a lubrication system may be arranged, supported by e.g. the annular disc 31. In alternative examples, the mobile link may have an annular configuration or the static link may have radial spokes as the above-described mobile link. In yet further examples, both links may have a substantially similar configuration.

In further examples, outer flexible couplings may further be provided between any of the links (mobile or static) or both links and a bearing ring of the bearing provided between the blade and the hub.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. A blade pitch system for a wind turbine, comprising:
a blade;
a rotor hub;
a first bearing ring fixed to the rotor hub, and a radially opposite second bearing ring fixed to the blade, with rolling elements between the first bearing ring and the second bearing ring;
a mobile link having an outer circumference fixed to the blade or to the second bearing ring;
a static link having an outer circumference fixed to the rotor hub or to the first bearing ring;
a motor coupled to a central reduction gearing, wherein a rotatable output of the central reduction gearing is fixed to the mobile link that is joined to a blade and allows rotation of the blade around a longitudinal axis of the blade, and
a static part of the central reduction gearing fixed to the static link, wherein
the system further comprises one or more flexible couplings configured to: (1) directly couple the rotatable output of the central reduction gearing to the mobile link; or (2) directly couple the static part of the central reduction gearing to the static link such that a torque about the blade longitudinal axis is transmitted between the blade and the reduction gearing while substantially limiting transmission of other loads.

2. A blade pitch system according to claim 1, wherein the flexible coupling is provided between the rotatable output of the central reduction gearing and the mobile link.

3. A blade pitch system according to claim 1, wherein the flexible coupling is provided between the static part of the central reduction gearing and the static link.

4. A blade pitch system according to claim 1, wherein the flexible coupling comprises flexible bushings.

5. A blade pitch system according to claim 1, wherein the mobile link is formed by two or more radial spokes symmetrically and radially arranged between the rotatable output of the central reduction gearing and a bearing ring connected to the blade.

6. A blade pitch system according to claim 1, wherein the static link comprises an annular disc.

7. A blade pitch system according to claim 6, wherein a void space is defined between the annular disc and the mobile link.

8. A blade pitch system according to claim 1, wherein the central reduction gearing comprises a planetary gear train.

9. A wind turbine rotor comprising a hub and one or more blades comprising a blade pitch system according to claim 1.

10. A wind turbine comprising a rotor according to claim 9.

11. A blade pitch system for a wind turbine, comprising:
a motor coupled to a central reduction gearing, wherein
a rotatable output of the central reduction gearing is fixed to a mobile link that in use is joined to a blade and allows rotation of the blade around a longitudinal axis of the blade, and
a static part of the central reduction gearing or the motor is fixed to a static link that in use is joined to a wind turbine hub, wherein
the system further comprises one or more flexible couplings that directly couple the rotatable output of the central reduction gearing and the mobile link.

12. A blade pitch system for a wind turbine, comprising:
a motor coupled to a central reduction gearing, wherein a rotatable output of the central reduction gearing is fixed to a mobile link that in use is joined to a blade and allows rotation of the blade around a longitudinal axis of the blade, and a static part of the central reduction gearing or the motor is fixed to a static link that in use is joined to a wind turbine hub, wherein the system further comprises one or more flexible couplings that directly couple the static part of the central reduction gearing or the motor and the static link.

* * * * *